United States Patent

[11] 3,607,522

| [72] | Inventors | Fred N. Phillips, Jr. |
| --- | --- | --- |
| | | Boston; |
| | | Donald Tobin, Needham, both of Mass. |
| [21] | Appl. No. | 633,942 |
| [22] | Filed | Apr. 26, 1967 |
| [45] | Patented | Sept. 21, 1971 |
| [73] | Assignee | Allied Research and Development Co. |
| | | Boston, Mass. |

[54] PROCESS FOR FINISHING SUBSTITUTE LEATHER MATERIALS
8 Claims, 5 Drawing Figs.

[52] U.S. Cl. .................................................. 156/209,
156/219, 156/247
[51] Int. Cl. .................................................... B32b 31/14
[50] Field of Search .......................................... 156/209,
219, 247, 234, 269; 161/DIG. 3; 117/10

[56] References Cited
UNITED STATES PATENTS

| 2,801,949 | 8/1957 | Bateman | 156/247 |
| --- | --- | --- | --- |
| 3,256,131 | 6/1966 | Koch et al. | 156/209 X |
| 2,813,052 | 11/1957 | Lancaster | 156/247 X |
| 2,862,846 | 12/1958 | Blackford et al. | 156/269 X |
| 3,014,828 | 12/1961 | Reese | 156/247 X |
| 3,311,520 | 3/1967 | Michaelson et al. | 156/209 |
| 3,434,861 | 3/1969 | Luc | 156/247 |

*Primary Examiner*—Samuel W. Engle
*Attorney*—Kenway, Jenney & Hildreth

ABSTRACT: This application discloses a process for finishing long sheets of substitute leather material having one surface of thermoplastic material by contacting the thermoplastic surface with a similarly shaped textured sheet, heating the superposed sheets under pressure in a series of sequential steps in a press, feeding each untreated portion to the press as the preceding portion is finished, and removing the textured sheet only after tests on a sample show the desired finish has been produced; if not, the superposed sheets are reprocessed. The full specification should be consulted for an understanding of the invention.

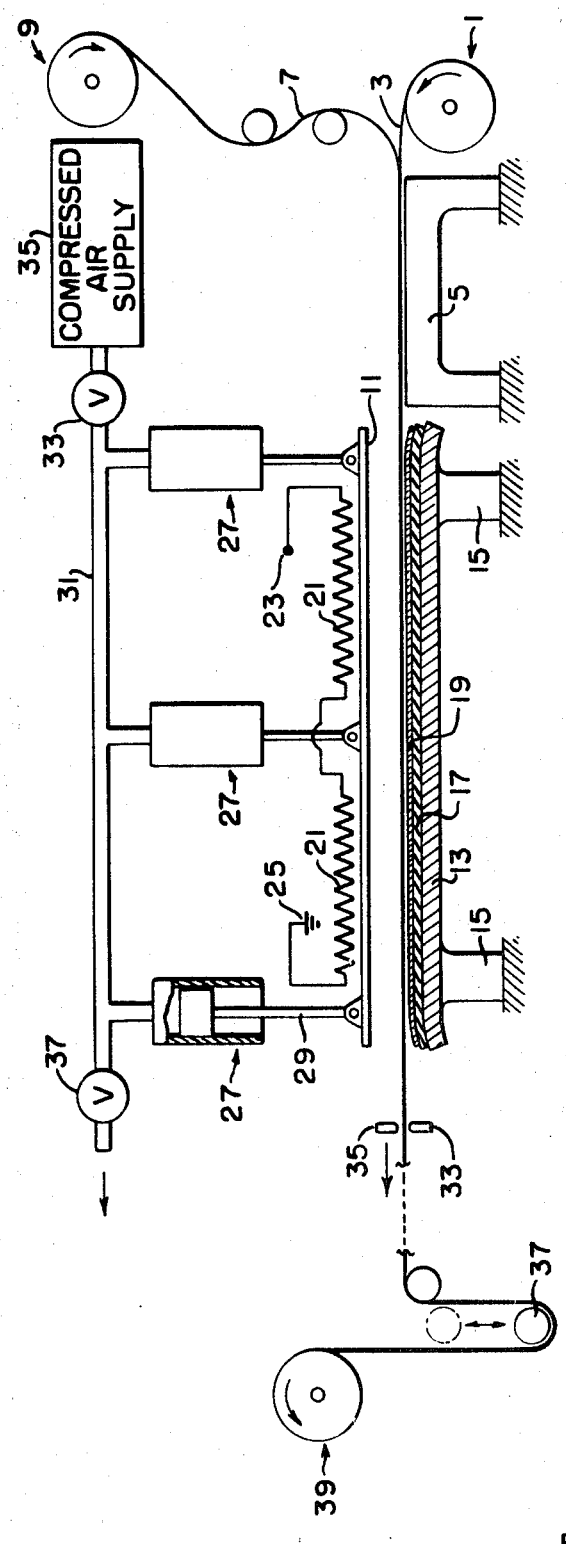

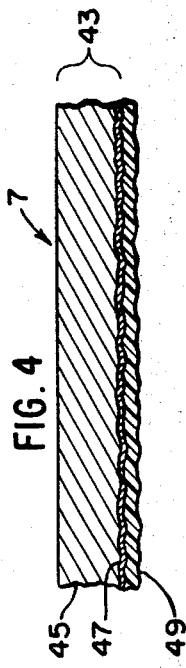
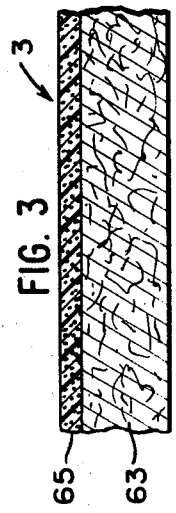
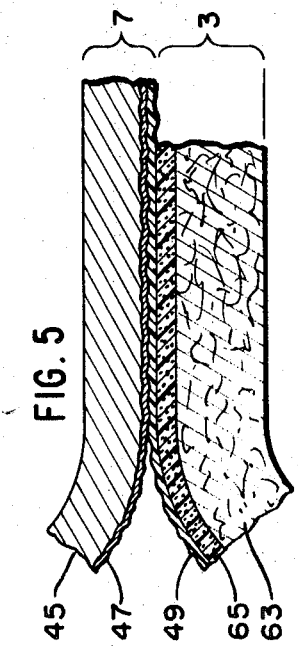
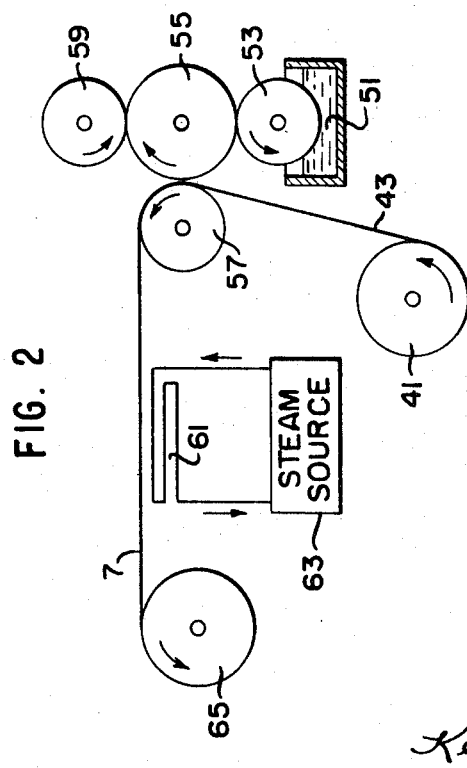

PROCESS FOR FINISHING SUBSTITUTE LEATHER MATERIALS

Our invention relates to substitute leathers, and particularly to a novel process for finishing substitute leather materials to provide a decorative grained surface and an improved leather-like hand.

Numerous materials have been developed simulating more or less closely the appearance, wearing properties and feel of leather. An excellent material for this purpose is marketed by E. I. DuPont deNemours and Company under the trade name "Corfam." That material comprises a layer of matted polyester fibers in a polyurethane matrix, coated on one side by a layer of blown polyurethane foam. Numerous other similar materials of a like character are disclosed in detail in U.S. Pat. No. 2,994,617, issued on Aug. 1, 1961 to J. S. Proctor for Leather Substitute. The matted fiber side of this material is quite similar in appearance to the flesh side of tanned leather. However, in he form commonly produced and sold, known in the trade as "greige goods," the outer side of the polyurethane foamed layer does not particularly simulate either the appearance or feel of the grain side of either finished or unfinished tanned leather. Also, the roll or hand of the material does not closely simulate that of high quality tanned and finished leather. Various expedients have been tried for treating the greige goods to produce an attractive, glossy, embossed appearance on the side simulating the grain side, but a number of problems have been encountered in doing so. On difficulty is that the greige goods represent a significant investment, and a relatively large proportion of what would be an acceptable cost per square foot of the finished material. Thus, direct processes such as direct embossing under heat and pressure tend to be expensive, both because of their inherent costs and because in the use of a direct process the greige goods is committed and cannot be reclaimed if the process does not produce acceptable results. Also, the relatively high pressures necessary in direct embossing, because of the relative thickness of the material relative to the thickness of the surface area to be treated, make it difficult to perform the desired surface treatment without damaging the underlying material. Specifically, an extremely desirable characteristic of the greige goods is the porosity that it possesses, making it acceptable as a substitute for leather of similar porosity for such uses as shoe making. Many otherwise acceptable processes would greatly reduce the porosity of the material. At the same time, the finished product should possess, in addition to scuff resistance and durability, a desirable break or roll, appreciable when the material is folded and flexed. It is a primary object of our invention to facilitate the finishing of artificial leathers to produce a high-quality durable, attractive product having properties equal or superior to the properties of carefully finished leather goods.

Briefly, the above and other objects of our invention are attained by the process of finishing artificial leather, and other flexible materials having a thermoplastic surface, to provide one surface having an embosses glossy flexible grained surface of substantial porosity, by bonding to the surface a thin film of smooth-grained porous thermoplastic elastomeric material. The process is carried out by first coating a suitable grained paper with a thin coating of a thermoplastic elastomeric resin, preferably a polyurethane, of controlled thickness. Preferably, the porosity of the surface of the paper to be coated is first reduced by coating or washing with a silicone resin, lacquering, or coating with a synthetic resin that will be infusible at the fusion temperature of the thermoplastic layer. This treatment makes the paper less porous and causes the thermoplastic layer to adhere rather lightly so that it can be readily stripped from the grained paper base sheet. The coated paper so prepared is then laid down with its thermoplastic side in contact with the thermoplastic side of the artificial leather to be finished, and placed in a press where it is heated under pressure to a temperature and for a time sufficient to fuse the thermoplastic coating on the grained paper to the thermoplastic side of the artificial leather goods. The pressure used serves also to compact the substitute leather a small amount, greatly improving the roll or hand of the finished material. Preferably, the materials to be treated are supplied in the form of long rolls, and lengths sufficient to fill the press are drawn out and sequentially treated. Since there is no relative movement between the coated grained paper and the artificial leather to which the thermoplastic layer on the grained paper is being transferred, and because the materials are relatively thick compared to the layers that are being acted on, there are no match marks produced as are characteristic of products previously produced by pressure embossing in which a dwell time is involved. And, because there is an appreciable dwell time, the required temperatures and pressures are not sufficient to damage the body of the artificial leather, but merely serve to compact it a desired amount to improve its handling qualities. An important advantage of the process is that the coated grained paper represents a relatively small investment in comparison with the cost of the greige goods to be processed. Accordingly, any defects in the layer to be transferred to the greige goods can be found by inspection of the relatively inexpensive coated paper before it is applied. Moreover, should there be defects in the finished product, such as failure of the grained layer to be transferred properly to the greige goods, the defective areas can be reprocessed in the press without damage, as the process is relatively mild and repetition does not damage the product. After the material from the press has been cooled, it can be inspected again for the purpose of discovering whether any defects have been produced. The product can then be stored indefinitely if desired, with the paper providing a protective coating for the finished surface of the artificial leather. When desired, the paper can be stripped away to leave a finished substitute leather material of attractive appearance and excellent durability, scuff resistance, porosity and roll.

The manner in which the process of our invention is carried out will best be understood in the light of the following detailed description, together with the accompanying illustrative drawings.

In the drawings;

FIG. 1 is a schematic diagram illustrating the process of out invention;

FIG. 2 is a schematic diagram of one process for preparing a coated paper used in the process of FIG. 1;

FIG. 3 is a schematic cross-sectional sketch illustrating the substitute leather material upon which the process of FIG. 1 is carried out;

FIG. 4 is a schematic fragmentary cross-sectional sketch of a coated paper employed in the process of FIG. 1;

FIG. 5 is a schematic fragmentary cross-sectional sketch of the product of the process of FIG. 1 illustrating the manner in which the grained paper is removed to produce the final product.

In FIG. 1, we have shown at 1 a roll of substitute leather to be finished. This material is preferably matted polyester fibers in a matrix of thermoplastic elastomeric polyurethane, the layer being approximately one-sixteenth of an inch in thickness, on which a layer of foamed polyurethane 10 to 14 mils in thickness is bonded. Such material is produced under the trade name "Corfam" by E. I. DuPont deNemours and Company. Other suitable materials are described in U.S. Pat. No. 2,994,617, above cited. The material is arranged on the roll 1 in such a manner that the upper surface, as the sheet 3 comes off the roll, is the polyurethane foamed surface. This material is first passed over a table 5 of any conventional construction, on which it is registered with a confronting sheet of coated paper 7 from a supply roll 9. As will appear, this paper is coated on the lower side as it comes down on to the table 5 with a thin coating of about 0.5 to 1 mil in thickness of polyurethane. At least the surface of the paper 7 that is coated with the polyurethane is grained, that is, it is embossed in a textured pattern simulating the grain side appearance of finished patent leather. Alternatively, for some effects the paper may be completely smooth.

The superposed sheets 3 and 7 are next passed between the platens of a flat bed press. The press comprises an upper platen 11, of aluminum or the like, and a lower platen comprising a baseplate 13, of metal or the like, supported on suitable legs 15. On the baseplate 13 are a pad 17, of silicone rubber or the like, of about one-fourth inch in thickness, and on the silicone pad 17 a conventional slip sheet 19 that is preferably made from a glass fiber blanket in a polytetrafluoroethylene matrix.

On the upper surface of the top platen 11 are arranged conventional electrical heating elements 21 adapted to be energized by alternating voltage, as from a conventional alternating-current source connected between a terminal 23 and a grounded terminal 25. Heating elements are selected to produce a desired operating temperature of the press, preferably between 300° and 320° F. for polyurethane materials. However, temperatures from 280° to 340° F. may be used, and somewhat different temperatures may be preferably for other materials such as polyvinylchloride. Means such as the cylinders 27 and piston 29 are provided to hold the platen 11 down against the lower platen and the intermediate superposed sheets 3 and 7 under pressure. In one practical embodiment of our invention, using a press having platens approximately 36 inches wide to handle 36-inch wide rolls, 12 such air cylinders were employed. While any conventional arrangement may be provided for supplying air to and exhausting air from the cylinders, as here shown they are connected to a common mainfold 31. The manifold 31 communicates through a valve 33 to a suitable conventional source of compressed air, here schematically shown as a compressor 35, and with the atmosphere through an exhaust valve 37. By this arrangement, when the valve 33 is open and the valve 37 is closed, the cylinders such as 27 receive air under pressure driving the pistons such as 29 down to hold the platen 11 against the superposed sheets at a desired pressure. The pressure may be from 10 to 30 pounds per square inch, but preferably is about 15 pounds per square inch for polyurethane materials. The heat and pressure are preferably maintained for about 50 seconds. Thereafter, the valve 33 is closed and the valve 37 is opened to release the press, whereupon the platen 11 may be raised either by springs, not shown, or by a manual lever arrangement. When the press 11 is open, a length of the composite sheet materials 3 and 7 equal to the length within the press less about one-half inch allowed for overlapping is drawn from the rolls 1 and 9, by pulling on the combined sheet 31. The finished sheet may be drawn out manually, or is preferably drawn out by a pair of nipper fingers 33 and 35 provided with a linkage for pressing them against the finished sheet 31 to grasp it, and conventional means for driving the fingers carrying the processed sheet 31 the desired distance once each time the press is opened. Since the details of suitable mechanical apparatus for driving the sheet do not form a part of our invention and will be well understood by those skilled in he art, they will not be described in detail.

The processed sheet material may be held under fixed tension by a conventional dancer roll schematically indicated at 37. At that point the material will have cooled substantially to room temperature. The finished artificial leather material is quite flexible, but must be kept smooth at this stage to avoid wrinkling the paper backing, which would produce a defective finish on the transferred polyurethane layer. From the dancer roll, the sheet 31 is wound up on a takeup roll 39.

A sample may be cut from the supply of finished, paper coated material on the takeup roll 39. By removing the paper from the sample, the processed material can be inspected to see that the polyurethane coating is properly bonded onto the substitute leather substrate. If is is not, the remaining material on the roll 39 can be taken back through the press and reprocessed without difficulty. After a sample has passed inspection, the paper sheet can be stripped from he finished product and reprocessed or discarded.

Having described the process generally, several steps will next be described in somewhat more detail. First, considering FIG. 2, the treated paper sheet 7 is made by coating thermoplastic elastomeric polyurethane on a prepared paper substrate held on a roll 41. The general character of the paper substrate 43 is indicated in FIG. 4. As there shown, the paper is basically a relatively heavy paper base 45 that has been coated as indicated at 47 on one side to make it essentially impervious and to prevent the subsequently deposited coat of polyurethane from penetrating into and being tightly bonded to the individual paper fibers. For this purpose, the coating 47 may be of silicone resin, or any suitable conventional synthetic resin that is infusible at the temperatures at which the press is operated, and which is not attacked by the polyurethane or a solvent that may be used in coating it. The release properties of the coating 47 may be further controlled by a mild silicone wash, or sodium silicate treatment, or the like, so that the subsequently deposited layer 49 of polyurethane will cling lightly to the paper, and will assume a lower surface conforming to the grained surface of the paper, but which can be readily stripped away. The polyurethane coating 49 may be produced in a substantially conventional manner as indicated in FIG. 2 by means of a bath 51 of a suitable thermoplastic elastomeric polyurethane, such as those discussed in U.S. Pat. No. 2,994,617 cited above, or other suitable thermoplastic elastomeric resin, by means of a conventional four-roll reverse roll coater. As shown, the coater may comprise a pickup roll 53, an applicator roll 55, and a rubber-coated backup roll 57. The thickness of the coating can be metered by the pickup roll 53 under the control of a metering roll 59 that exerts an adjustable pressure on the roll 55. The coated paper sheet 7 then passes over a suitable heater, here shown as steam coils 61 supplied by a suitable steam source 63, to dry the coating. The finished sheet 7 may be stored on a roll 65 until required for use as the supply roll 9 in the process of FIG. 1. An alternate method of preparation of the coated paper 7 is described in an article entitled "Coating With Thermoplastic Urethane Films" beginning on page 132 of Modern Plastics, Dec. 1965 issue, published by McGraw-Hill, Inc. In that article, a process of coating polyurethane by extrusion to a controlled thickness is described that will also produce a satisfactory article.

The advantages of using the coated paper sheet 7 to prepare the final coating 49 that will constitute one outer surface of the finished substitute leather article are several. First, the paper 7 can be inspected to be sure that the coating 49 is properly deposited, smooth and uniform, and free from defects. The thickness of the layer 49 can be quite closely controlled in comparison with the control that could readily be exerted over a similar coating placed on the relatively thick substitute leather greige goods. As the porosity of the finished article is quite important, the porosity of the layer 49 can also be tested at this time. The ability to inspect the coating 49 at this stage is quite important because any defective portions can be discarded before the relatively expensive greige goods is invested. Another advantage is that an inventory of different coatings 49 can be built up at very reasonable expense in comparison with the cost of building up a similar inventory of finished goods. Thus, various embossed grained paper patterns can be used, and different colors and thicknesses of the layer 49 can be provided, to be used as desired.

FIG. 3 indicates the general character of the greige goods 3 on which the process is carried out. As schematically indicated, the article consists of a base layer 63 of matted fibers, preferably polyester fibers, in an elastomeric thermoplastic polyurethane matrix. On the surface of the layer 33 is a thin coating 65, of for example 10 to 12 mils in thickness, of foamed thermoplastic elastomeric polyurethane produced by use of a suitable conventional foaming agent in a semicured polyurethane layer.

Referring next to FIG. 5, in the process described in connection with FIG. 1, the polyurethane layer 49 and the foamed polyurethane layer 65 on the greige goods 3 are heated to fusion, becoming welded together at their contiguous surfaces. When the composite material is then cooled, and the paper 45 stripped away, the finished layer 49 remains with the substitute leather material, and the paper 45 and its release coating 47 are removed. In the process of FIG. 1, the pressure is preferably selected so that the greige goods 3 is compacted by about 8 to 10 mils in thickness. Thus, as a specific example, greige goods 56 mils in thickness were first buffed on the matted fiber side to 53 mils, to achieve a smoother suede appearance. After coating under heat and pressure in the manner just described, the finished material was 45 mils in thickness.

While the process of finishing substitute leather by transferring a grained coating of polyurethane to its foam surface in the manner just described is preferred, many of the advantages of the process of our invention, in its broader aspects, may be obtained without the use of the transferred layer. Specifically, one characteristic advantage of the process of out invention is that the final surface to applied to the substitute leather material is first produced on an inexpensive substrate, where it can be inspected for quality and uniformity before the expensive greige goods are invested. Other advantages are that, while the treatment under head and pressure is a batch process, a continuous length of finished material without match marks can be produced, and that an imperfect product can be reprocessed. These advantages can also be obtained by a modification of our process in which the grained paper 45 and its release coating 47 are fed directly to the press, whereby the desired compaction of the greige goods is still obtained, and the grained finish surface is imparted by embossing in the press. In accordance with another modification, sheet materials other than paper can be employed, such as cloth fabric, lace, woven matting or the like, to impart a desired texture to the finished surface in the press.

While we have described our invention with respect to the details of a preferred method of carrying it out, many changes and variations will be obvious to those skilled in the art upon reading the description, and such can obviously be made without departing from the scope of out invention.

Having thus described our invention, what we claim is:

1. The process of finishing flexible sheet material having at least one surface of synthetic thermoplastic material, to have a grain-textured finished surface, comprising the steps of placing over the sheet material a sheet of paper having a grained imperforate surface against which a layer of thermoplastic material has been formed with a like-grained texture, with the thermoplastic layer on the paper in contact with the thermoplastic surface of the sheet material to be finished, heating the superposed materials under pressure to a temperature sufficient to fuse and weld the contiguous thermoplastic surfaces, cooling the superposed materials, and stripping off the paper sheet.

2. The process of finishing flexible sheet material having at least one surface of thermoplastic material sealable at a temperature T, comprising the steps of placing over the sheet material a sheet of paper having at least one grained surface and on the correspondingly grained surface a grained coating of imperforate material infusible at the temperature T and on said coating a grained layer of thermoplastic material sealable at the temperature T, said paper sheet being placed on the sheet material to be finished with the thermoplastic layer on the paper in contact with the thermoplastic surface of the sheet material to be finished, heating the superposed sheet materials to the temperature T under pressure to seal the contiguous thermoplastic layers together, cooling the superposed sheet materials, and stripping off the paper sheet with its imperforate coating to produce finished flexible sheet material having a grained thermoplastic surface.

3. The process of finishing a substitute leather of the class comprising a porous layer of matted fibers in a matrix of thermoplastic elastomeric material having bonded on one surface thereof a layer of porous thermoplastic elastomeric material, comprising the steps, carried out upon two sheets of material, one of the substitute leather to be finished, and the other of paper having a grained surface on which is a layer of correspondingly grained thermoplastic material, of placing said sheets in contact with the thermoplastic layers together, heating the contiguous sheets under pressure to a temperature sufficient to fuse the contiguous thermoplastic layers together, cooling the bonded sheets, and removing the paper so that the grained thermoplastic material provides the outer surface of the finished substitute leather.

4. The process of finishing a substitute leather comprising a porous layer of matted fibers in a matrix of thermoplastic elastomeric polyurethane having one surface coated with blown thermoplastic elastomeric polyurethane foam, carried out upon two rolls of sheet material of equal width, one of the substitute leather to be finished and one of paper having at least one grained surface and on said surface a releasable layer of correspondingly grained thermoplastic elastomeric polyurethane, and using a flat bed press having platens of at least the width of said rolls, one platen being of metal and the other bearing a smooth slip sheet, said press being provided with means for heating said metal platen, comprising the steps of drawing out equal lengths from said rolls and placing them together between the platens of he press with said polyurethane surfaces in contact, closing the press and heating the enclosed lengths to between 280° and 340° F. under a pressure of from 10 to 30 pounds per square inch for a time sufficient to bond the sheets together by fusion of the contiguous polyurethane surfaces and to compact the substitute leather sufficiently to substantially improve the break of the finished substitute leather, opening the press, withdrawing the bonded lengths and thereafter drawing slightly shorter additional lengths from the rolls into the press, continuing the process by repeating the steps carried out on the first lengths to produce bonded sheets having a length substantially greater than the first length, and stripping the grained paper from the cooled, bonded sheets.

5. The process of finishing a substitute leather material having on one surface a layer of thermoplastic elastomeric polyurethane foam, comprising the steps of placing on the foam surface of a sheet of the substitute leather material a sheet of grained paper having lightly adhering to one surface a layer of similarly grained thermoplastic elastomeric polyurethane with the polyurethane layer on the paper in contact with the foam layer, heating the superposed sheets to a temperature of about 300° to about 320° F. under a pressure of about 15 p.s.i. for about 50 seconds, thereby fusing the contiguous polyurethane layers together, cooling the bonded sheets, and stripping off the grained paper to leave the substitute leather finished with the grained polyurethane thereon.

6. The process of finishing flexible synthetic sheet material to have a textured surface, comprising the successive steps of providing a preformed substrate of said sheet material with a surface of thermoplastic material sealable at a temperature T, providing a finish layer for said sheet material preformed with an outer finish surface having said texture and infusible at said temperature T and with an inner surface of thermoplastic material sealable at said temperature T and having a backing sheet carried on said finish surface and readily peelable therefrom, and bonding said substrate layer and said finish layer together under heat and pressure with said surfaces of thermoplastic material thereof disposed against each other so as to bond said thermoplastic materials together at a temperature at least equal to said temperature T, and stripping said backing sheet from said finish surface of said finish layer so that said finish surface is openly exposed.

7. The process of finishing flexible sheet material, having at least one outer surface of synthetic thermoplastic material, to have a surface with a prescribed desired finish, comprising the steps of placing over the sheet material a backing sheet having a surface with said prescribed desired finish and against which a layer of thermoplastic material has been formed with a like finish, with the thermoplastic layer on the backing sheet in contact with the thermoplastic surface of the sheet material to be finished, heating the superposed materials under pressure to a temperature sufficient to fuse the contiguous thermoplastic surfaces together, cooling the superposed materials, and stripping off the backing sheet to expose said outer surface.

8. The process as defined in claim 7 comprising the further step of providing on said backing sheet a coating of imperforate material infusible at said fusing temperature and having said prescribed desired finish thereon and against which said layer of thermoplastic material is formed with said like finish.

UNITED STATES PATENT OFFICE
CERTIFICATE OF CORRECTION

Patent No. 3,607,522  Dated September 21, 1971

Inventor(s) Fred N. Phillips, Jr. and Donald Tobin

It is certified that error appears in the above-identified patent and that said Letters Patent are hereby corrected as shown below:

Column 1, line 19, "he" should be --the--.

Column 1, line 57, "embosses" should be --embossed--.

Column 2, line 41, "out" should be --our--.

Column 3, line 18, "preferably" should be --preferable--.

Column 3, line 28, "mainfold" should be --manifold--.

Column 3, line 55, "he" should be --the--.

Column 3, line 69, after "If", "is" should be --it--.

Column 3, line 72, "he" should be --the--.

Column 4, line 54, "is" should be --are--.

Column 5, line 16, "out" should be --our--.

Column 5, line 16, before "applied" insert --be--.

Column 5, line 20, "head" should be --heat--.

Column 5, line 37, "out" should be --our--.

Column 5, line 55, delete "correspondingly".

Column 5, line 55, before "grained" (second occurrence) insert --correspondingly--.

Column 6, line 20, "he" should be --the--.

Signed and sealed this 3rd day of October 1972.

(SEAL)
Attest:

EDWARD M. FLETCHER, JR.
Attesting Officer

ROBERT GOTTSCHALK
Commissioner of Patents